| United States Patent | [15] 3,645,497 |
| Nyboer | [45] Feb. 29, 1972 |

[54] RESILIENT GATE VALVE STRUCTURE

[72] Inventor: Robert P. Nyboer, 2016 Calle Candela, Fullerton, Calif. 92633

[22] Filed: Oct. 14, 1970

[21] Appl. No.: 80,536

[52] U.S. Cl. ................................251/148, 251/326, 32/33
[51] Int. Cl. ...........................................................F16k 3/28
[58] Field of Search..................251/148, 326, 327, 328, 329, 251/147, 193, 195, 196; 32/33

[56] References Cited

UNITED STATES PATENTS

| 2,723,831 | 11/1955 | Ine | 251/329 X |
| 2,893,684 | 7/1959 | Williams et al. | 251/328 |
| 3,232,578 | 2/1966 | Cousins | 32/33 X |

*Primary Examiner*—William R. Cline
*Attorney*—William C. Babcock

[57] ABSTRACT

A valve structure that includes an elongate valve body through which a longitudinal bore extends, said structure including a transversely and longitudinally movable resilient valve member for control of a flowable material through said bore. The valve structure is particularly adapted for use in the field of dentistry on aspirator instruments, but may be used equally well in the control of a flowable material from a first zone to a second enclosed zone that is maintained at a negative pressure relative to said first zone.

8 Claims, 6 Drawing Figures

Patented Feb. 29, 1972

3,645,497

INVENTOR.
ROBERT P. NYBOER

BY
William R. Bobrick
ATTORNEY

RESILIENT GATE VALVE STRUCTURE

BACKGROUND OF THE INVENTION

1. Field of the Invention

A valve structure.

2. Description of the Prior Art

In the field of dentistry a valve structure must be used in connection with an aspirator assembly to control the operation thereof. Various types of valves have been devised and used for this purpose but such prior art devices have operational disadvantages that are objectionable. Such prior art valves available for use on aspirators are of an unduly complicated structure, inconvenient to use, unreliable in operation, tend to clog with solid materials, and are difficult and time-consuming to clean.

The primary purpose in devising the present valve structure is to supply one that has a simple mechanical structure, will not jam in operation, is easily cleaned, requires a minimum of maintenance attention, and effects a fluidtight shutoff between first and second zones that have a differential in pressure therebetween.

SUMMARY OF THE INVENTION

A valve structure that includes an elongate valve body that has a longitudinal bore extending between first and second end portions thereof, and a transversely and longitudinally movable valve member that controls the flow of material through the valve body. The valve member may be conveniently molded from a polymerized resin or other metallic or nonmetallic materials that may be deformed longitudinally into an arcuate configuration. Spring steel may be used to define the valve member if desired. The valve member has a relatively low coefficient of friction to the valve body on which it is mounted and accordingly the possibility of the valve member jamming is reduced to a minimum. The valve structure is capable of being manufactured from materials that are readily available in the commercial market, and requires no extensive plant facilities for the production thereof.

A major object in devising the present valve is to supply one that has an extremely simple mechanical structure, is practically impossible to jam when in operation, requires a minimum of maintenance attention, is easily cleaned, is compact and pleasing in design, and operates particularly well where there is a substantial differential in pressure between the source of the flowable material that passes therethrough and the container to which the material is delivered.

Another object of the invention is to provide a valve that is of compact, streamlined appearance, is substantially free from projecting elements, requires a minimum of force to operate, and due to the angled design thereof is particularly adapted for use in the field of dentistry as an aspirator control instrument for the removal of fluids and solids from oral cavities.

DESCRIPTION OF THE PREFERRED EMBODIMENT

Figure 3:
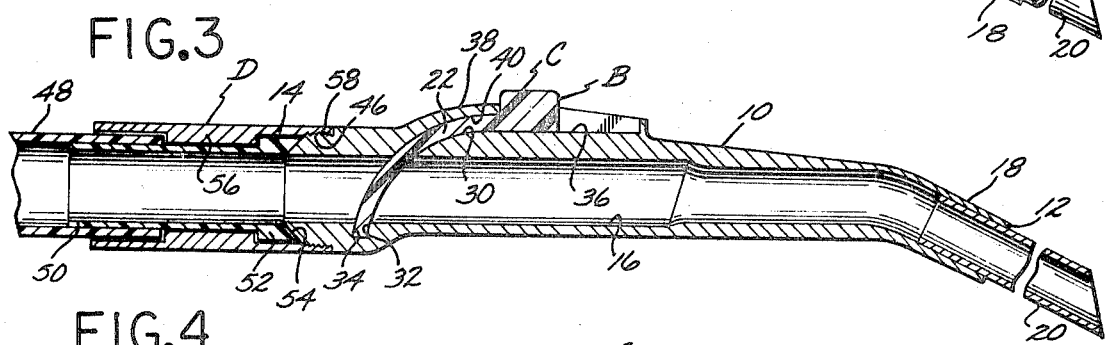
FIG. 3 is a longitudinal cross-sectional view of the valve structure, with the valve member in a first closed position.

The valve A as may be seen in FIGS. 1 to 4 includes an elongate valve body 10 having first and second ends 12 and 14 respectively. A bore 16 extends longitudinally through the body 10. Flow of flowable material (not shown) through the valve A is controlled by a valve member B which in FIG. 3 is shown in a first closed position and in FIG. 4 in a second open position.

The valve A when it is to be used in the field of dentistry, in connection with an aspirator assembly, preferably has the portion 18 of the valve body that defines the first end 10 angularly disposed relative to the balance of the valve body. A resilient tube 20 is supported from the valve portion 18 by friction or other means, with the tube extending to an oral cavity in a patient (not shown) to remove fluid and other flowable material therefrom.

Figure 1:
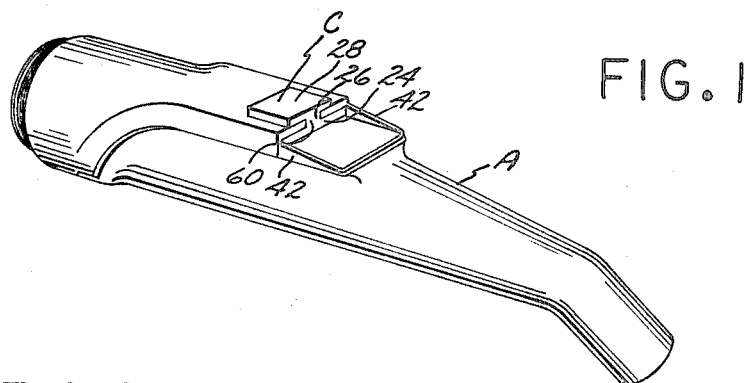
FIG. 1 is a perspective view of the valve structure.
Figure 2:
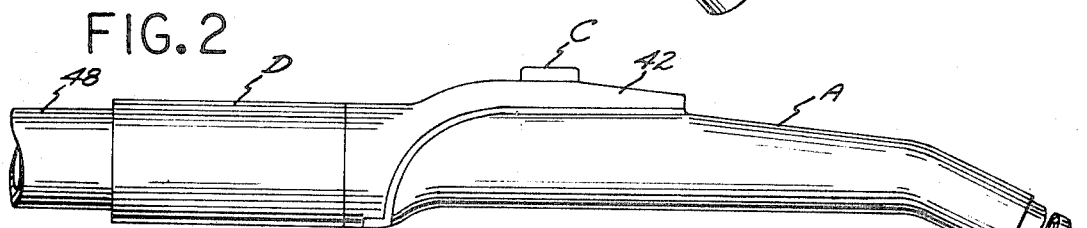
FIG. 2 is a side elevational view of the device.
Figure 4:
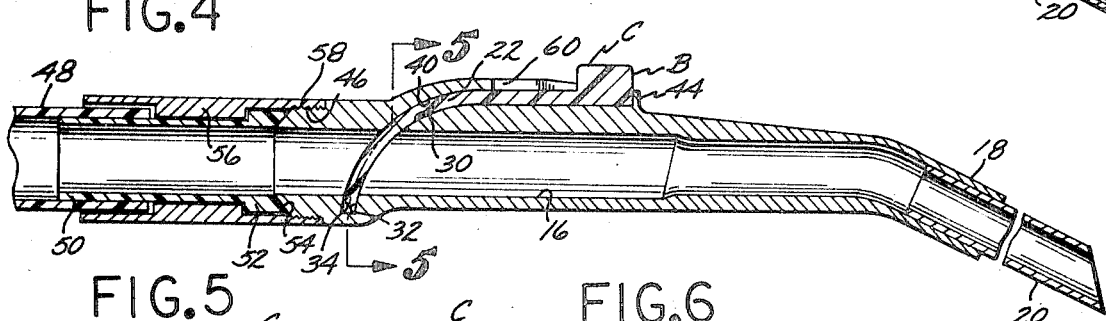
FIG. 4 is a second longitudinal cross-sectional view of the valve structure, with the valve member in a second open position.

The valve member B as may best be seen in FIGS. 1, 3 and 4 is in the form of an elongate rectangular strip 22 of substantial thickness that as illustrated is formed from a resilient polymerized resin. The first end 24 of the valve member B as best seen in FIG. 1 has a narrow upright lug 26 extending therefrom that develops on the outer end into a tab 28, with the lug and tab cooperating to provide an actuating handle C best seen in FIG. 1.

An arcuate transverse slot 30 is formed in the valve body A intermediate the ends 12 and 14 thereof, with the slot 30 being of greater width than the diameter of the portion of bore 16 across which it extends. The transverse slot 30 is defined by a first internal surface 32 that is longitudinally spaced from a second curved arcuate surface 34. The first surface 32 as best seen in FIG. 3 develops into a flat longitudinally extending surface 36 that slidably supports at least a portion of the valve member B. The valve body 10 includes a first portion 38 that extends outwardly therefrom, and the first portion defining a fourth arcuate internal surface 40 that overhangs a part of the surface 36, and merges with the second surface 34.

The first and second surface 32 and 34 are uniformly spaced from one another as well as is the fourth surface 40 from the portion of the third surface 36 over which it is disposed. Due to the uniform spacing of the surfaces as above defined, the slot 30 is of uniform thickness, and slidably and sealingly engages the rectangular resilient strip 22 that forms a part of the valve member B. The valve member B is shown in a first position in FIG. 3, in which the resilient strip 22 extends completely across the bore 16 and obstructs the flow of material through the valve body 10 from the first end 12 to the second end 14 thereof.

The valve body 10 along the longitudinal side of the third surface 36 has two ribs 42 extending upwardly therefrom, which ribs prevent lateral movement of the valve member B when it is slid from the first position shown in FIG. 3 to a second open position as illustrated in FIG. 4. A second transverse rib 44 extends outwardly from the valve body 10 and is connected to the free ends of the ribs 42, with the second rib 44 serving as a stop as may be seen in FIG. 4 to prevent the valve member B being moved beyond the second position. The stop 44 does not prevent the valve member B from being removed from the valve body 10 for cleaning the body, or a new member B being installed therein.

Figure 5:
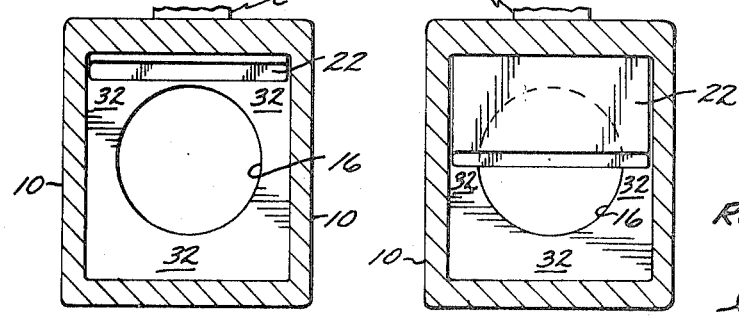
FIG. 5 is a transverse cross-sectional view of the valve structure taken on the line 5—5 of FIG. 4, with the valve member in the open position.
Figure 6:
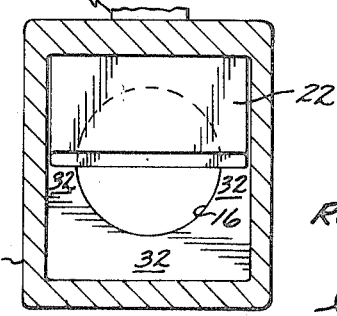
FIG. 6 is a second transverse cross-sectional view of the valve structure but with the valve member moved to a position to partially obstruct the flow of material through the valve.

In FIG. 5 it will be noted that the portion of the valve body 10 on which the third surface 36 is defined in substantially a rectangular in transverse cross section. The transverse view of the valve member 10 as shown in FIG. 3 illustrates the position of the strip 22 when the valve member B is in a second open position. In FIG. 6 the position of the valve member 22 is shown when it is in a third position intermediately situated between the first position illustrated in FIG. 3 and the second position shown in FIG. 4. The valve member 10 adjacent the second end 14 is of transverse circular cross section, and this end portion having a number of external threads 46 thereon. The end 14 defines a tapered ring-shaped surface as illustrated in FIGS. 3 and 4.

An elongate flexible conduit 48 is provided that slidably engages the external surface of a tubular connector 50 as illustrated in FIG. 3, which connector has a flange 52 projecting outwardly from the end thereof most remote from the conduit 48. The flange 52 defines a tapered ring-shaped surface 54 that is in abutting rotatable contact with the ring-shaped end surface 14.

A coupling D is provided as shown in FIG. 3 that has an internal collar 56 that slidably engages the external surface of the connector 50, with the collar 56 being in abutting contact with the flange 52, to maintain the flange in sealing contact with the end 14. The connector D has threads 58 formed on an interior end surface thereof that engage threads 46 to hold the connector on the valve body, illustrated in FIG. 3.

The use and operation of the valve A has previously been described in detail and need not be repeated.

In FIG. 1, it will be seen that the valve body 10 is tapered on the external surface thereof. This tapered configuration adds an ornamental appearance to the valve, and permits it to be easily grasped in the palm of the hand of a user (not shown) when the thumb of the user's hand is resting on the handle C of valve member B, to control the flow of flowable material through the valve structure.

What is claimed is:

1. A valve structure for controlling the rate of flow of a flowable material therethrough that comprises:
  a. an elongate rigid valve body that has first and second ends and through which body a longitudinal bore extends, said body having an arcuate transverse slot therein that is of greater width than the diameter of said bore and extends thereacross, said slot being defined by first and second internal surfaces of said body, said first surface merging with a third flat longitudinal surface on the exterior surface of said body, with said body including a first portion that overlies a part of said third surface and is outwardly spaced therefrom, and said first portion defining a fourth interior arcuate surface that merges with said second surface;
  b. an elongate resilient valve member that slides longitudinally on said third surface and at all times slidably engages said slot, with said valve member when in a first position having a first end portion thereof extending transversely across said bore to block the latter, and said valve member when in a second position having said first portion thereof disposed outwardly from said bore to permit free flow of material through the latter;
  c. first means for preventing said valve member from moving laterally relative to said third surface;
  d. second means for preventing said valve member from being moved longitudinally beyond said second position; and
  e. third means for moving said valve member to either said first or second position or a third position intermediate therebetween.

2. A valve structure as defined in claim 1 in which said first means includes two laterally spaced parallel first ribs that extend outwardly from the portion of said body that define said third surface.

3. A valve structure as defined in claim 2 in which said second means is a second transverse outwardly extending rib that extends between the ends of said first ribs most remote from said first portion of said body.

4. A valve structure as defined in claim 1 in which said third means is a handle that extends outwardly from a second end portion of said valve member, with said handle being disposed in a longitudinal opening in said first portion of said valve body when said valve member is in said first position.

5. A valve structure as defined in claim 1 in which said flowable material enters said valve body through said first end thereof and discharges through said second end, with the portion of said body defining said second end being of circular transverse cross section and having threads formed on the external surface thereof, and said second end being in the shape of a tapered ring, with said valve structure in addition including:
  f. fourth means removably connectable to said threads for conveying said flowable material passing through said body to a desired location.

6. A valve structure as defined in claim 5 in which said fourth means includes:
  g. a length of resilient conduit;
  h. a rigid tubular connector that projects from a first end of said conduit, said connector including an outwardly projecting flange that has a tapered end surface that slidably and sealingly contacts said tapered ring; and
  i. a tubular coupling that includes an internal collar disposed between first and second interior end portions of said coupling, said collar rotatably engaging said connector and said flange thereon, with said first interior end portion having first threads formed thereon that engage said threads on said valve body to hold said conduit and connector in rotatable engagement with said valve body.

7. A valve structure as defined in claim 1 in which an end portion of said valve body on which said first end is defined is angularly disposed relative to the balance of said valve body.

8. A valve structure as defined in claim 7 which in addition includes:
  f. a length of resilient conduit that extends from said first end of said valve body.

* * * * *